United States Patent
Dinkel

(10) Patent No.: US 7,313,998 B2
(45) Date of Patent: Jan. 1, 2008

(54) MOTOR/PUMP UNIT, PARTICULARLY FOR ANTI-SKID VEHICLE BRAKE SYSTEMS

(75) Inventor: Dieter Dinkel, Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 55 days.

(21) Appl. No.: 10/526,528

(22) PCT Filed: Aug. 27, 2003

(86) PCT No.: PCT/EP03/09480

§ 371 (c)(1), (2), (4) Date: Apr. 26, 2006

(87) PCT Pub. No.: WO2004/029453

PCT Pub. Date: Apr. 8, 2004

(65) Prior Publication Data

US 2006/0254416 A1    Nov. 16, 2006

(30) Foreign Application Priority Data

Sep. 4, 2002  (DE) ............................... 102 41 306

(51) Int. Cl.
*F04B 9/04* (2006.01)
*F16C 19/49* (2006.01)
*B60T 17/02* (2006.01)

(52) U.S. Cl. .................. 92/72; 92/86; 417/273

(58) Field of Classification Search .................. 91/491; 92/72, 86; 417/273; 384/452, 454, 455
See application file for complete search history.

(56) References Cited

U.S. PATENT DOCUMENTS 2,063,787 A * 12/1936 Brown ........................ 384/454
2,687,615 A * 8/1954 Morrow ....................... 417/273
3,765,736 A * 10/1973 Pitner .......................... 384/455
4,983,100 A * 1/1991 Budecker ..................... 417/273
5,213,482 A * 5/1993 Reinartz et al. ............. 417/273
5,230,275 A * 7/1993 Hodge et al. ................... 92/72
5,642,988 A * 7/1997 Zorn ............................ 417/273
6,478,554 B1 * 11/2002 Dinkel et al. ................... 92/86

(Continued)

FOREIGN PATENT DOCUMENTS

DE    2 205 363    8/1972

(Continued)

*Primary Examiner*—Thomas E. Lazo
(74) *Attorney, Agent, or Firm*—Ratner Prestia

(57) ABSTRACT

The present invention relates to a motor-pump unit for slip-controlled vehicle brake systems, including an accommodating member for hydraulically active elements comprising at least one working piston, which is arranged and guided in the accommodating member so as to be movable in a translational manner, and projects with an end into a crank space 6 for a rotationally movable driving element which is encompassed by a bearing having a bearing ring with an essentially bowl-shaped bottom, and extends over a frontal end of the driving element, and wherein the bottom is movable with an outside surface to rest against a crank space bottom.

To improve friction and wear conditions, the crank space bottom includes an axial bearing element for the bottom which, starting from the accommodating member, projects in the direction of the bottom and has a contact surface with an area smaller than the area of the outside surface.

12 Claims, 1 Drawing Sheet

U.S. PATENT DOCUMENTS 6,497,562 B1 * 12/2002 Greiff et al. ................ 417/560

FOREIGN PATENT DOCUMENTS

| DE | 196 36 508 A1 | 3/1998 |
| DE | 197 04 752 A1 | 8/1998 |
| DE | 198 26 961 A1 | 12/1998 |
| DE | 198 39 430 A1 | 3/2000 |
| FR | 2 256 689 | 7/1975 |
| WO | WO 98/10191 | 3/1998 |

* cited by examiner

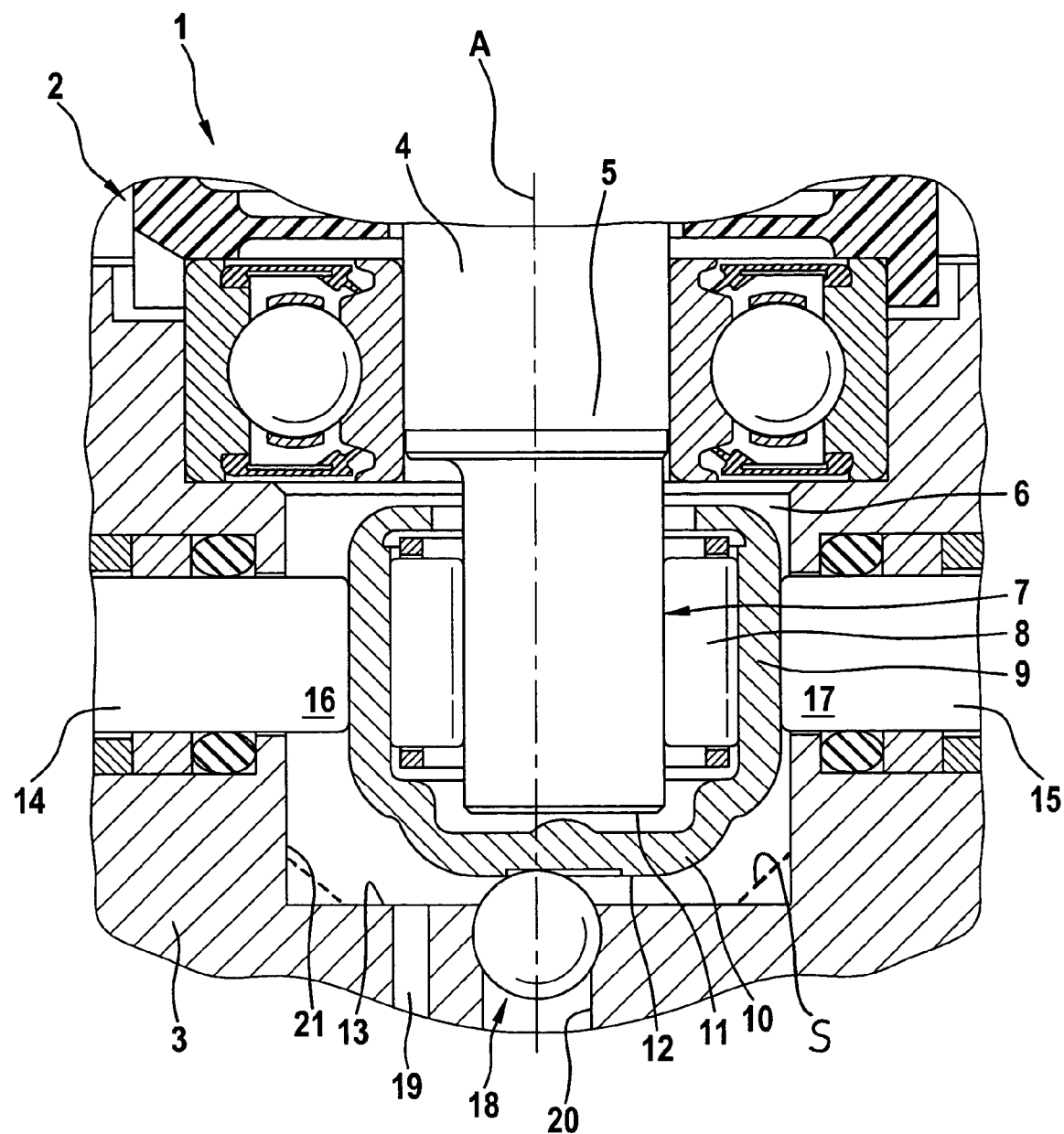

MOTOR/PUMP UNIT, PARTICULARLY FOR ANTI-SKID VEHICLE BRAKE SYSTEMS

TECHNICAL FIELD

The present invention relates to a motor-pump unit for slip-controlled vehicle brake systems.

BACKGROUND OF THE INVENTION

DE 196 36 508.2 discloses a radial piston pump with working pistons, wherein the working pistons are accommodated in a cylinder block and driven by means of a driving shaft that projects into a crank space of the cylinder block, and a radial bearing is arranged on the eccentric part of the driving shaft. A piston end that projects radially inwards out of the cylinder block can be acted upon through the bearing shell, said bearing shell being closed in the form of a bottom wall on the side facing the end of the eccentric portion. The bearing shell can execute a rotational movement relative to the driving shaft in dependence on the prevailing friction conditions. In addition, the bearing shell can move into contact with a bottom of the crank space in order to axially support the driving shaft. Because each contact action causes friction and wear between bearing ring and crank space bottom, the efficiency of the motor-pump unit requires improvement.

BRIEF SUMMARY OF THE INVENTION

An object of the invention is to improve the friction and wear performance of the motor-pump unit known in the art. According to the invention, this object is achieved in that the crank space bottom includes an axial bearing element for the bottom which, starting from the accommodating member, projects in the direction of the bottom and has a contact surface with an area that is smaller than the area of the outside surface. The axial bearing element reduces friction losses and thereby improves the efficiency of the motor-pump unit. Abrasion and wear particles are prevented from developing, which could cause destruction of an electronically controlled brake system.

In a favorable embodiment of the invention, the axial bearing element has a design smaller than the crank space bottom and leaves open at least part of the crank space bottom. It is thus rendered possible to use this spared part for other purposes, such as having a channel open into the crank space bottom, which can serve for the discharge of leakage fluid.

When the axial bearing element is made of a bearing material that is considerably harder than the material of the accommodating member, losses are reduced in addition.

In a particularly low-cost embodiment of the invention, the axial bearing element is designed as a ball, said ball being fixed to the accommodating member.

Preferably, the crank space bottom includes a bore in which the ball is secured in such a fashion that at least part of the ball projects from the crank space bottom. The ball can be press-fitted or wedged in the bore.

To simplify the manufacture, the bore is arranged in alignment with an axis of a driving shaft for accommodation of the ball. Further, it is advantageous to arrange the bore concentrically to a bore of the crank space. This allows fabricating the bores in one working operation by means of a tool, thereby reducing the number of machining steps and, consequently, the costs of manufacture.

BRIEF DESCRIPTION OF THE DRAWING

The only FIGURE shows a partial range of a motor-pump unit in a cross-sectional enlarged view.

DETAILED DESCRIPTION OF THE PREFERRED EMBODIMENTS

A motor-pump unit 1 comprises an electric motor 2, which is secured to an accommodating member 3 for hydraulically active elements such as, in particular, electromagnetically operable valves, accumulator chambers, damper chambers, and channels interconnecting the elements. A pivoted driving shaft 4 projects with one end into a crank space close to the accommodating member and is provided with a driving element 7 such as a directly ground eccentric or a press-fitted eccentric sleeve. Among others in the area of a frontal end 11, the driving element 7 is encompassed by a bearing 8, which includes a bearing ring 9 made of a hard being material with a substantially bowl-shaped bottom 10. An outside surface 12 of the bearing ring 9 points in the direction of the crank space bottom 13.

The accommodating member 3 houses at least one working piston, but preferably two working pistons 14, 15 (as shown in the FIGURE) being guided so as to be movable in a translational manner. The working pistons 14, 15 project with an end 16, 17 into the crank space 6 and rest against the driving element 7, with bearing 8 interposed. The working pistons 14, 15 are driven by the rotation of the driving element 7 being also eccentric in comparison to an axis A of the driving shaft 4. This causes displacement of an incompressible medium, in particular brake fluid, out of a working chamber (not shown). A resetting movement of each working piston 14, 15 in the direction of the driving element 7 is brought about by non-illustrated resetting springs or by a coupling ring (not shown) which is disposed in the crank space 6 and urges both pistons 14, 15 elastically in the direction of the driving element 7. It is self-explanatory that associated with each working chamber is at least one inlet valve (not shown) and at least one outlet valve (not shown), adopting in a pressure stroke or in a suction stroke alternately an opening position or a closing position.

The crank space bottom 13 is provided with an axial bearing element 18 which, starting from the accommodating member 3, projects in the direction of the bottom 10 of the bearing ring 9 and has a contact surface with an area smaller than the area of the outside surface 12. The contact surface produced is ideally punctiform in order to minimize friction processes between bearing ring and crank space bottom.

According to the FIGURE, the extension of the axial bearing element 18—in a radial direction with respect to the axis A of the driving shaft 4—is smaller than the crank space bottom 13 so that at least part of the crank space bottom 113 is spared. This part is not covered by the axial bearing element 18 so that it is possible that a hydraulic channel 19 can open here into the crank space 6, said channel serving for the discharge of leakage fluid. Channel 19 e.g. concerns a bore discharging the leakage fluid, e.g. by means of a non-return valve, into the ambience or into a reservoir. The reservoir can principally be positioned within the accommodating member or in a housing for a non-illustrated electronic controller, which is arranged on a side of the accommodating member 3 remote from the electric motor 2. The invention renders it possible by simple means to diminish the mounting space required for the crank space 6 because the crank space bottom 13 passes over into the crank space wall by way of slopes S, as shown in dotted lines in the FIGURE.

The axial bearing element 18 is made of a bearing material, which is essentially harder compared to the material of the accommodating member 3. The hardness of the bearing ring 9 and of the axial bearing element 18 is basically identical so that wear is basically distributed equally.

As is apparent from the FIGURE, the axial bearing element 18 is configured as a ball with is fixed to the accommodating member 3. In another embodiment, which cannot be seen in the FIGURE, the axial bearing element comprises an essentially flat base disc abutting on the crank space bottom. The contact surface for the bottom of the bearing is provided centrically on the disc. It may be a welded, quasi punctiform button or simply a projection made by non-cutting shaping and pointing in the direction of the bottom. To ensure that part of the crank space bottom is left open, the disc has at least one aperture or cutout being in alignment with a channel for the discharge of leakage fluid.

In alignment with the axis A of the driving shaft 4, a bore 20 is provided in the crank space bottom 13 in which a ball is fastened in such a manner that part of the ball protrudes from the crank space bottom 13. The ball is press-fitted or wedged in the bore 20. When the diameter of the ball is rated to be at least slightly larger than the diameter of the bore 20, a press-fit operation of the ball will simultaneously have as a result a fastening, localized plastic deformation of the accommodating member 3. Bore 20 is arranged concentrically to a bore 21 of the crank space 6 so that the two bores 20, 21 can be made with a tool in one machining step.

In a driving rotation of the driving shaft 4, the bottom 10 of the bearing ring 9 describes an eccentric circular path in relation to a fixed point of contact on the ball.

The invention permits using a comparatively soft, low-cost light-weight material such as a light alloy or plastics for manufacturing the accommodating member 3 with little effort for wear protection purposes. Even if the motor-pump unit has longer on-times of the motor in order to able to execute functions such as ESP, TCS, OHB, Hill-Holder or collision avoidance, it is adequate to use an aluminum material for the accommodating member 3, without the need for electrolytic oxidation.

LIST OF REFERENCE NUMERALS 1 motor-pump unit
2 motor
3 accommodating member
4 driving shaft
5 end
6 crank space
7 driving element
8 bearing
9 bearing ring
10 bottom
11 frontal end
12 outside surface
13 crank space bottom
14 working piston
15 working piston
16 end
17 end
18 axial bearing element
19 channel
20 bore
21 bore
A axis
S slope

The invention claimed is:

1. Motor-pump unit for slip-controlled vehicle brake systems, including an accommodating member for hydraulically active elements comprising at least one working piston, which is translationally movably guided in the accommodating member, and projects with an end into a crank space for a rotationally movable driving element which is encompassed by a bearing having a bearing ring with an essentially bowl-shaped bottom, and extends over a frontal end of the driving element, and the bottom comprises an outside surface which is movable to rest against a crank space bottom, wherein the crank space bottom includes an axial bearing element for the bottom which, starting from the accommodating member, projects in the direction of the bottom and has a contact surface with an area that is smaller than the area of the outside surface.

2. Motor-pump unit as claimed in claim 1, wherein the axial bearing element has an extension that is smaller than the crank space bottom and leaves open at least part of the crank space bottom.

3. Motor-pump unit as claimed in claim 1, wherein the axial bearing element is made of a bearing material that is considerably harder than the material of the accommodating member.

4. Motor-pump unit as claimed in claim 1, wherein the bearing ring is made of a hard bearing material which has approximately the hardness of the bearing material of the axial bearing element.

5. Motor-pump unit for slip-controlled vehicle brake systems, including an accommodating member for hydraulically active elements comprising at least one working piston, which is arranged and guided in the accommodating member so as to be movable in a translational manner, and projects with an end into a crank space for a rotationally movable driving element which is encompassed by a bearing having a bearing ring with an essentially bowl-shaped bottom, and extends over a frontal end of the driving element, and wherein the bottom with an outside surface is movable to rest against a crank space bottom, wherein the crank space bottom includes an axial bearing element for the bottom which, starting from the accommodating member, projects in the direction of the bottom and has a contact surface with an area that is smaller than the area of the outside surface wherein the axial bearing element is designed as a ball, and in that the ball is fixed to the accommodating member.

6. Motor-pump unit as claimed in claim 5,
wherein the crank space bottom includes a bore in which the ball is secured in such a fashion that at least part of the ball projects from the crank space bottom.

7. Motor-pump unit as claimed in claim 5,
wherein the ball is press-fitted or wedged in a bore.

8. Motor-pump unit as claimed in claim 5,
wherein the ball is press-fitted or wedged in a bore and the ball has a diameter being at least slightly larger than the bore.

9. Motor-pump unit as claimed in claim 5, wherein the crank space bottom includes a bore in which the ball is secured in such a fashion that at least part of the ball projects from the crank space bottom, and wherein the bore is arranged in alignment with an axis (A) of a driving shaft.

10. Motor-pump unit as claimed in claim 5 wherein the crank space bottom includes a bore in which the ball is secured in such a fashion that at least part of the ball projects from the crank space bottom, and wherein the bore is arranged concentrically to a bore of the crank space.

11. Motor-pump unit for slip-controlled vehicle brake systems, including an accommodating member for hydraulically active elements comprising at least one working piston, which is arranged and guided in the accommodating member so as to be movable in a translational manner, and projects with an end into a crank space for a rotationally movable driving element which is encompassed by a bearing having a bearing ring with an essentially bowl-shaped bottom, and extends over a frontal end of the driving element, and wherein the bottom with an outside surface is movable to rest against a crank space bottom, wherein the crank space bottom includes an axial bearing element for the bottom which, starting from the accommodating member, projects in the direction of the bottom and has a contact surface with an area that is smaller than the area of the outside surface wherein the crank space bottom includes a bore in which the ball is secured in such a fashion that at least part of the ball projects from the crank space bottom, and wherein the bore is arranged concentrically to a bore of the crank space, and wherein the bearing ring with the bottom encompasses an eccentric so that the bottom, due to a driving rotation, describes an eccentric circular path in relation to the fixed contact surface on the ball.

12. Motor-pump unit for slip-controlled vehicle brake systems, including an accommodating member for hydraulically active elements comprising at least one working piston, which is arranged and guided in the accommodating member so as to be movable in a translational manner, and projects with an end into a crank space for a rotationally movable driving element which is encompassed by a bearing having a bearing ring with an essentially bowl-shaped bottom, and extends over a frontal end of the driving element, and wherein the bottom with an outside surface is movable to rest against a crank space bottom, wherein the crank space bottom includes an axial bearing element for the bottom which, starting from the accommodating member, projects in the direction of the bottom and has a contact surface with an area that is smaller than the area of the outside surface, the axial bearing element has a design smaller than the crank space bottom and leaves open at least part of the crank space bottom, wherein a channel opens into the left open part of the crank space bottom and the channel is used for the discharge of leakage fluid.

* * * * *